US005378798A

United States Patent [19]
Ehrlich

[11] Patent Number: 5,378,798
[45] Date of Patent: Jan. 3, 1995

[54] COMPOSITION AND PROCESS FOR COATING METALLIC SUBSTRATES

[75] Inventor: Martin L. Ehrlich, Columbus, Ohio

[73] Assignee: Shell Oil Company, Houston, Tex.

[21] Appl. No.: 911,967

[22] Filed: Jul. 10, 1992

[51] Int. Cl.⁶ .................. C08G 69/26; C08G 73/10; B32B 27/00

[52] U.S. Cl. .................... 528/310; 427/421; 427/422; 427/435; 528/310; 528/322; 528/338; 528/339; 528/339.3; 528/340

[58] Field of Search ........... 427/421, 422, 435; 528/339.3, 310, 322, 338, 339, 340

[56] References Cited

U.S. PATENT DOCUMENTS

| | | | |
|---|---|---|---|
| Re. 31,522 | 2/1984 | Rieder | 528/335 |
| 3,087,835 | 4/1963 | Auer | 117/73 |
| 3,089,783 | 5/1963 | Carlson et al. | 427/421 |
| 3,433,415 | 3/1969 | Enssle | 239/126 |
| 3,726,711 | 4/1973 | Hogstrom | 17/96 |
| 3,816,028 | 6/1974 | Schouteeten et al. | 417/214 |
| 3,885,074 | 5/1975 | Chandler | 264/342 R |
| 4,225,473 | 9/1980 | Heiberger | 427/421 |
| 4,374,741 | 2/1983 | Rieder | 528/347 |
| 4,546,015 | 10/1985 | Lovell | 427/421 |
| 4,783,344 | 11/1988 | Bravet et al. | 427/421 |
| 4,912,196 | 3/1990 | Leoni et al. | 528/339 |
| 4,944,964 | 7/1990 | Schmidt et al. | 427/421 |
| 5,019,317 | 5/1991 | Slocum et al. | 264/300 |
| 5,027,742 | 7/1991 | Lee et al. | 427/421 |
| 5,089,064 | 2/1992 | Reghi | 427/421 |
| 5,132,180 | 7/1992 | Kishi | 428/458 |
| 5,156,892 | 10/1992 | Lapluye et al. | 427/421 |
| 5,160,766 | 11/1992 | Waltrip et al. | 427/421 |
| 5,248,529 | 9/1993 | Nammond et al. | 427/421 |

FOREIGN PATENT DOCUMENTS

| | | |
|---|---|---|
| 3128984 | 3/1982 | Germany . |
| 3836924 | 5/1990 | Germany . |
| 5054374 | 4/1980 | Japan . |
| 57-023295 | 2/1982 | Japan . |
| 1192980 | 5/1970 | United Kingdom . |

Primary Examiner—Samuel A. Acquah
Assistant Examiner—P. Hampton-Hightower

[57] ABSTRACT

Disclosed are polyamides which are the reaction product of (A) an acid component of which 15-99 wt. % comprises one or more saturated or unsaturated dibasic $C_{28}$-$C_{44}$ carboxylic acid, 1-50 wt. % comprises one or more saturated or unsaturated monobasic $C_{14}$-$C_{22}$ carboxylic acid, another 1-50 wt. % comprises one or more saturated or unsaturated $C_2$-$C_{22}$ carboxylic acids, and optionally polybasic $C_2$-$C_{14}$ and tribasic $C_{42}$-$C_{66}$ carboxylic acids, and (B) an amine component of which 10-90 wt. % comprises diethylene triamine and/or one or more $C_2$-$C_6$ alkylene diamines, and 10-90 wt. % comprises a poly(oxyalkylene) diamine whose molecular weight is 500-2000. The polyamides are solid at room temperature and fluid at elevated temperature so as to be capable of application as a protective coating to a substrate such as metal.

12 Claims, No Drawings

COMPOSITION AND PROCESS FOR COATING METALLIC SUBSTRATES

BACKGROUND OF THE INVENTION

The present invention relates to the subject of providing protective coatings to metallic substrates. It relates more particularly to providing coatings to ferrous and non-ferrous products, and particularly steel products, to protect them from corrosion and abrasion.

It is, of course, widely recognized that articles of ferrous and non-ferrous metal find a wide variety of applications in the modern world and that in the overwhelming majority of those applications the metal is subject to abrasion, corrosion, or both over time. Thus, it has become necessary to fashion protective layers or coatings to prolong the life of the metallic substrate.

A particularly problematic aspect of the susceptibility of metal to corrosion arises when the metallic substrate in question is intended to be used in construction. It is typical that metallic articles, such as bees, girders, coils, pipe sections, and the like are placed at a construction site a substantial period of time before they will all be used or incorporated into the construction. The articles are thus exposed for an often considerable length of time to the corrosive effects of the atmosphere. Then, when the article is finally to be used, it is often necessary to invest additional time and energy in removing some or all of the accumulated corrosion from the article.

It has not been unrecognized that an appropriate coating applied to such articles before they are exposed to a corrosive atmosphere might alleviate the aforementioned problems. Traditionally, solvent-based lacquers and varnishes have been the materials of choice for putting anti-corrosion coatings onto e.g. steel pipe sections. These coatings are primarily employed to prevent the pipes from rusting during storage. These lacquers and varnishes are typically sprayed, flooded or poured onto the metallic substrates. However, such coating systems exhibit several deficiencies. Among these is a risk of fire. This risk is due to several factors; one factor is the high flammability of the solvent and of the lacquer or varnish components. In addition, spraying such a relatively fluid product necessarily disperses the lacquer or varnish into the vicinity around the metallic substrate as well as onto the metallic substrate itself, which increases the potential of exposure to a source of ignition. Spraying such material also atomizes the fluid, which increases all the more the susceptibility of the product to ignition and conflagration.

In addition, solvent-based lacquer and varnish systems represent a major source of emissions of the volatile organic compounds employed in the solvent system. Indeed, such systems particularly comprise 50 to 75% solvent. It will be appreciated that the volatilization of such substances poses environmental and health risks, which are of ever-increasing concern to society.

Thus, there is a need for a material which is capable of readily forming a corrosion-deterring protective coating on metallic substrates such as steel parts, and does so without posing safety, environmental or health risks to the user or to the surrounding environment.

BRIEF SUMMARY OF THE INVENTION

The present invention achieves these and other objectives which will become apparent. One aspect of the present invention comprises a flowable polyamide, which is solid at room temperature, which comprises the reaction product of an acid component and an amine component. The acid component comprises:

(a) about 15 wt. % to about 99 wt. % of one or more dibasic carboxylic acids containing 28 to 44 carbon atoms and having 0 to 6 carbon-carbon double bonds;

(b) from 0 to about 80 wt. % of one or more tribasic carboxylic acids containing 42 to 66 carbon atoms and having 0 to 9 carbon-carbon double bonds;

(c) from 0 to about 50 wt. % of one or more polybasic carboxylic acids containing 2 to 14 carbon atoms, 2 to 4 —COOH groups, and containing 0 to 2 carbon-carbon double bonds;

(d) about 1 wt. % to about 50 wt. % of one or more monobasic carboxylic acids containing 2 to 22 carbon atoms and 0 to 3 carbon-carbon double bonds; and (e) in addition to component (d) about 1 wt. % to about 50 wt. % of one or more monobasic carboxylic acids containing 14 to 22 carbon atoms and 0 to 3 carbon-carbon double bonds, all the foregoing percentages being based on the weight of the acid component.

The amine component comprises:

(A) about 10% to about 90% by weight of said amine component of one or more compounds selected from the group consisting of diethylene triamine and saturated alkylene diamines containing 2 to 6 carbon atoms; and (B) about 10% to about 90% by weight of said amine component of one or more diamines of the formula H-(Alk-O)$_n$—H wherein each Alk is independently —CH$_2$CH$_2$— or —CH$_2$C(CH$_3$)H-provided that two Alk groups are substituted with —NH$_2$, and wherein n is selected such that the molecular weight of H-(Alk-O)$_n$—H is between 100 and 5000.

Another aspect of the present invention comprises substrates, in particular metallic substrates, which are coated with a polyamide meeting the foregoing description. Another aspect of the present invention comprises a process for rendering a metallic substrate corrosion-resistant comprising heating a polyamide meeting the foregoing description to a fluid condition and then applying the heated polyamide to the substrate to form a coating of said polyamide on said substrate. Yet another aspect of the present invention comprises metallic substrates which have been coated in accordance with such a process.

DETAILED DESCRIPTION OF THE INVENTION

As indicated, the present invention is useful in providing a coating on any desired substrate whether it be of wood, plastic or metal. The invention is particularly advantageous with respect to metallic substrates in view of the protection against corrosion which the coating provides. The metallic substrate can be any ferrous or non-ferrous metal, including but not limited to steel, iron, nickel, copper, zinc, aluminum, tin, and alloys thereof such as brass, bronze, and the like. In the preferred embodiments of this invention, the metallic substrate is steel, and in particular structural sections of steel such as steel pipe sections, girders, beams, plates and coils.

The acid component employed in formation of the polyamide of the present invention is a mixture of several organic carboxylic acids. The acid component comprises about 15 wt. % to about 99 wt. % (all percentages of constituents of the acid component are percent by weight of the weight of the acid component) of one or more dibasic carboxylic acids containing 28 to 44 carbon atoms and having 0 to 6 carbon-carbon double bonds. Preferred, and satisfactory, dibasic acids are known as dimer acids, formed by dimerization of monocarboxylic acids each containing 14 to 22 carbon atoms each. The monocarboxylic acids can have 0 to 4, and more preferably 1 to 3, carbon-carbon double bonds each. Thus, the dimerized dibasic acid following dimerization at a double bond on each monocarboxylic acid will contain 0 to 6, and more preferably 0 to 4, of such carbon-carbon double bonds. This constituent preferably comprises about 75 wt. % to about 90 wt. % of the acid component. The preferred dibasic acids contain 36 carbon atoms and are unsaturated.

The acid component may optionally contain up to about 80 wt. % of one or more tribasic carboxylic acids containing 42 to 66 carbon atoms and 0 to 9 carbon-carbon double bonds. The tribasic acid need not be present, but as indicated relatively high tribasic acid contents can be accepted. Preferred tribasic acids are formed by trimerization of monocarboxylic acids each containing 14 to 22 carbon atoms and having 0 to 4 and more preferably 1 to 3 carbon-carbon double bonds. Commercially available preparations containing dimerized dibasic acids will generally contain as well some trimerized acids as well as polybasic and/or monobasic acids. Preferably, the tribasic acid content is about 3 wt. % to about 20 wt. % of the acid component. The preferred tribasic acid, if present, contains 54 carbon atoms and is the byproduct of dimerization of monocarboxylic acids containing 1 or 2 carbon-carbon double bonds.

The acid component may optionally also contain up to about 50 wt. % of one or more polybasic carboxylic acids containing 2 to 14 carbon atoms, containing 2 to 4 carboxylic (—COOH) groups and containing 0 to 2 carbon-carbon double bonds. Preferably, the polybasic acid comprises about 0.5 wt. % to about 5 wt. % of the acid component.

Examples of preferred polybasic acids containing 2 to 14 carbon atoms include nonanedioc (azelaic) acid, adipic acid, dodecanedioc acid, and sebacic acid.

The acid component further comprises about 1 wt. % to about 50 wt. % of the acid component of one or more monobasic carboxylic acids containing 14 to 22 carbon atoms and 0 to 3 carbon-carbon double bonds. Examples of such monobasic acids include myristic acid, stearic acid, palmitic acid, oleic acid, linoleic acid, linolenic acid, ricinoleic acid, gadoleic acid, arachidonic acid, behenic acid, cetoleic acid, and erucic acid. Preferably, the monobasic acid containing 14 to 22 carbon atoms comprises about 3 wt. % to about 20 wt. % of the acid component.

The acid component further comprises another 1 wt. % to about 50 wt. % of one or more monobasic carboxylic acids containing 2 to 22 carbon atoms and 0 to 3 carbon-carbon double bonds. Examples of monobasic acids meeting these criteria include the above-identified acids containing 14 to 22 carbon atoms, and lauric acid, capric acid, caprylic acid, caproic acid, butyric acid, and acetic acid. Preferably, the monobasic acid containing 2 to 22 carbon atoms comprises about 10 wt. % to about 20 wt. % of the acid component. Higher chain lengths are preferred, in order to minimize the solubility of the polyamide in water.

It should be understood that the foregoing two criteria must both be satisfied in compositions according to the present invention. The same acid, but separate amounts thereof, can satisfy both of these criteria. For example one or a mixture of e.g. saturated monobasic carboxylic acids containing 14 to 22 carbon atoms can satisfy both of the aforementioned criteria, provided that the total amount thereof comprises at least 2 wt. % of the acid component so that the two criteria described herein are both satisfied.

The polyamide coating of the present invention is also made from an amine component which is a mixture of materials. The amine component comprises about 10 wt. % to about 90 wt. % (by weight of the amine component) of one or more compounds selected from the group consisting of diethylene triamine and saturated alkylene diamines containing 2 to 6 carbon atoms. Preferred diamines of this type include ethylene diamine and hexamethylene diamine. The diamine substitution on the alkylene moiety can occur at the two ends of the alkylene moiety. Alternatively, one of the amine groups can be at the end of the alkylene moiety and the other between the two ends, or both amines can be attached at carbon atoms which are between the two ends of the alkylene moiety. Preferably, the total of the diethylene triamine and alkylene diamine containing 2 to 6 carbon atoms comprises about 30 wt. % to about 40 wt. % of the amine component.

The amine component also comprises about 10 wt. % to about 90 wt. % (by weight of the amine component) of one or more poly(oxyalkylene)diamines of the general formula H-(Alk-O)$_n$—H wherein each Alk is independently —CH$_2$CH$_2$— or —CH$_2$C(CH$_3$)H— provided that two of the Alk groups are substituted with —NH$_2$. The molecular weight of this poly(oxyalkylene) diamine is between 100 and 5000. Preferably, the diamine has a structure corresponding to the formula H$_2$N-(Alk-O)$_n$—H wherein each Alk is as defined herein, and one other Alk group within the structure is substituted with —NH$_2$.

The (Alk-O) groups, which will be recognized as ethoxy and propoxy units, may consist entirely of ethoxy units, entirely of propoxy units, may comprise a random interdistribution of ethoxy and propoxy units, or may be composed of a series of blocks of poly(ethoxy) and poly(propoxy) sections. Satisfactory poly(oxyalkylene) diamines are available from Texaco Chemical Company under the tradenames Jeffamine D-230, D-400 and D-2000. Diamines having a particular desired structure or molecular weight, when not commercially available, can readily be synthesized in accordance with known procedures. This diamine constituent preferably comprises about 60 wt. % to about 70 wt. % of the amine component.

The most preferred composition embodying the present invention comprises the following (all amounts are in parts by weight):

| Component | Amount |
|---|---|
| C$_{36}$ Dimer Acid | 573.1 |
| Stearic Acid | 95.0 |
| Azelaic Acid | 13.3 |
| Diamine (Jeffamine D-400) | 112.0 |
| Ethylene Diamine | 60.3 |
| Antioxidant | 1.0 |
| Antifoamant | Trace |

To prepare the polyamide of the present invention, the acid component and the amine component are simply intimately intermixed and reacted together. Preferably, the amount of the acid component relative to the amount of the amine component is selected so that the ratio of the number of free carboxylic groups on the acid component to the number of free amine groups on the amine component is approximately 1:1. The numbers of carboxylic and amine groups can be determined independently through conventional analytical techniques. An exactly 1:1 relationship between the carboxylic groups and the amine groups is not necessary but helps to avoid the waste that would ensue if an excessive amount of one component or the other were employed.

The acid component and the amine component can simply be combined, with stirring, in a closed reactor vessel. The reactor vessel should preferably be capable of drawing a vacuum over the reacting mixture near the end of the progress of the reaction, in order to facilitate the necessary step of gradually removing from the reacting mixture the water which is formed by the condensation reaction between the carboxylic groups and the amine groups. Application of vacuum throughout the reaction is undesirable if it would remove unreacted acid or amine from the reaction mixture.

Preferably, the reaction mixture is heated to a degree sufficient to promote the reaction, but not so high that constituents of the acid component or the amine component volatilize or decompose. In general, reaction temperatures on the order of 350° F.–450° F., and more preferably about 420° F., are satisfactory. Sufficient heat is necessary also to ensure that the polyamide which is formed during the reaction remains fluid, thereby promoting the desired completion of the reaction between as yet unreacted ingredients.

It will be noted that the reaction to form the polyamide of the present invention does not require a solvent or a suspending agent. The reaction between the acid component and the amine component does not require any special initiator or catalyst. It may be convenient to add up to about 1% of phosphoric acid to promote the condensation reaction, although this component is not necessary.

The polyamide formed by the foregoing reaction should preferably exhibit the ability to soften sufficiently at elevated temperatures so as to become fluid. In the fluid condition, the polyamide can be applied to a substrate through spraying, brushing, rolling, pouring, extruding, or any other conventional technique for applying a liquid to a solid substrate. In general, satisfactory polyamides will be solid at room temperature and fluid at temperatures below which the polyamide degrades, chars, or solidifies. A preferred temperature range at which this combination of characteristics is exhibited is 300° F. to 350° F. Preferably, the maximum softening point of the polyamide formed according to the present invention is about 280° F., and its maximum viscosity is about 1500 cps at 320° F. It will be recognized that achieving the desired flowability, i.e. sufficiently low viscosity at moderately elevated temperatures that the polyamide can be applied as described hereinabove, can be accomplished through appropriate adjustment of the constituents of the acid component and the amine component. Such adjustment is readily within the ability of those of ordinary skill in this art.

In a preferred method of application of the polyamide of the present invention, the polyamide is heated to about 340° F. so that it is fluid and is then applied under pressure using any appropriate mechanism onto the surface of the substrate on which it is desired to deposit a protective coating. It will be noted that no solvent, carrier, or suspending agent of any sort is required for application of the fluid polyamide to the substrate. Coatings of any desired thickness can be readily obtained, by appropriate conventional adjustment of the rate of application and the number of applications of the polyamide to the substrate. Coatings on the order of e.g. about 0.05 to about 2 mm can thus readily be achieved. Preferably, the nozzle or other applying head of the mechanism is close to the substrate surface so that chilling of the polyamide by the ambient air is minimized.

A particularly preferred manner of applying the polyamide of the present invention includes a heating medium for melting the polyamide. The heating medium is circulated through the system to maintain the polyamide in a molten state prior to application. A molten plastic circuit feeds the molten plastic to an application vessel and scavenges any overspray for return through the system. A conveyor transports the object to be coated through the application vessel and a preheating system is located along the conveyor upstream of the application vessel. The application vessel includes a plurality of circumferential nozzles which spray the polyamide onto the object to be coated. The application vessel includes a recovery vessel for reheating and scavenging any overspray. The uniformity and thickness of the coating applied to the object can be controlled in a variety of manners. A hydraulic circuit adjusts the pressure of the molten plastic, the distance of the nozzles from the object to be coated and the height of the application vessel. Adjustments can also be made to the conveyor speed, the preheated temperature of the object and the temperature of the molten plastic.

Thus, such a preferred system would comprise a means for heating the polyamide to melt it; a means for circulating the molten polyamide to an application vessel; a means for continuously reheating the molten polyamide contiguous with said circulating means; a means for transporting the object to be coated through said application vessel; said application vessel including a means for continuously reheating the molten polyamide within said application vessel prior to application of the molten polyamide to the object; a means for applying the molten polyamide to the object within said application vessel; a means for collecting any overspray within said application vessel; a means for continuously reheating the collected overspray within said application vessel; a means for scavenging the reheated overspray connected to said collecting means; and a means for recirculating and reheating the scavenged molten polyamide.

In other words, the system would comprise a body defining an axial passage to allow passage of the object to be coated; a means within said body for supplying molten polyamide for application to the object; a plurality of nozzle blocks axially oriented in the body including a passageway in fluid communication with the molten polyamide supply means; spray nozzles having an opening for expelling molten polyamide carried by each block in fluid communication with the passage and oriented such that the axis of the nozzle is declined toward the axis of the body at an angle of from about 20° to about 45°; a catch means in the body for collecting polyamide material not adhering to the object and returning such material for reuse; and a means within the body for maintaining the polyamide material in a molten state.

The substrate to which the fluid polyamide composition is applied can be at ambient temperature or can be heated. If it is heated, the temperature should be below the temperature of the fluid polyamide. Thus, when the polyamide is applied, e.g. sprayed, onto the substrate, the polyamide cools rapidly upon contacting the substrate. The polyamide thus very quickly forms a smooth, hard, dense, protective coating on the substrate. The applied material thus exhibits minimal and, indeed, non-existent tendency to splash or run off of the substrate; the applied polyamide stays where it is applied. There is thus no need to be concerned with safety, environmental or health risks, since there are no by-products or volatilized solvents or carriers emitted upon application of the fluid polyamide to the substrate. It will be recognized that if the polyamide is overheated it may exhibit a slight tendency to emit "smoke", but it is a very straightforward matter to keep the temperature of the molten polyamide below the temperature at which "smoke" is generated while still being able to maintain the desired fluidity and sprayability of the molten polyamide.

The polyamide of the present invention is also useful as an adhesive in applications not requiring a high-strength bond. The polyamide exhibits moderate tack briefly after application; such that another material such as a layer or wrapper of heavyweight paper, plastic film, or cloth can be adhered to the polyamide.

The invention will be described further in the following examples which are intended to serve as illustrative rather than limiting descriptions of the invention.

EXAMPLE 1

573.1 g of a dimer acid, "Empol 1018" (available from Emery Chemical Co. (now Henkel Chemical Co.) comprising 6% $C_{18}$ monobasic acid, 79% dimerized $C_{18}$ acid, and 15% trimerized and higher oligomers of $C_{18}$ acid), 95 g of octadecanoic (stearic) acid, 13.3 g of nonanedioc (azelaic) acid, 500 g of a poly(oxyalkylene)-diamine having a molecular weight of 2000 and 60.3 g of ethylenediamine were charged into a round bottom three-neck flask equipped with a water jacketed condenser. The contents were agitated and slowly heated to about 445° F. (230° C.) over a period of four hours. The temperature was maintained at about 445° F. for two hours, following which the mixture was placed under a vacuum of 28.5 in. Hg for a period of one hour. The batch was then cooled to about 338° F. (170° C.) and discharged from the flask. The resulting polymer had a Ring and Ball softening point (as determined in accordance with ASTM Test No. E-28) of 266° F. (130° C.), and a Brookfield viscosity of 235 cps at 320° F. (160° C.) using a SC4-27 spindle at a speed of 100 RPMs.

EXAMPLE 2

507.3 g of the dimer acid employed in Example 1, 109.7 g stearic acid, 29.8 g azelaic acid, 112 g of poly-(oxyalkylene)diamine having a molecular weight of 400, 50.2 g ethylenediamine, and 22 g hexamethylenediamine were charged to a flask and reacted as described in Example 1. The resulting polymer had a Ring and Ball softening point of 264° F. (129° C.) and a Brookfield viscosity of 370 cps at 320° F. (160° C.) using a SC4-27 spindle at a speed of 100 RPM.

What is claimed is:

1. A process for coating a metallic substrate to improve its corrosion resistance, the process comprising:
   (1) providing a solventless flowable polyamide which is a solid at room temperature, exhibits a viscosity less than 1500 cps at 320° F., and comprises the reaction product of:
      (I) an acid component
         (a) about 75 wt. % to about 90 wt. % of which comprises one or more dibasic carboxylic acids containing 28 to 44 carbon atoms and having 0 to 6 carbon-carbon double bonds;
         (b) from 0 to about 20 wt. % of which comprises one or more tribasic carboxylic acids containing 42 to 66 carbon atoms and having 0 to 9 carbon-carbon double bonds;
         (c) from 0.5 to about 5 wt. % of which comprises one or more polybasic carboxylic acids containing 2 to 14 carbon atoms, containing 2 to 4 COOH groups, and containing 0 to 2 carbon-carbon double bonds;
         (d) about 1 wt. % to about 20 wt. % of which comprises one or more monobasic carboxylic acids containing 14 to 22 carbon atoms and 0 to 3 carbon-carbon double bonds; and
         (e) another about 1 wt. % to about 20 wt. % of which comprises one or more monobasic carboxylic acids containing 2 to 22 carbon atoms and 0 to 3 carbon-carbon double bonds which can be the same or different that component (d); with
      (II) an amine component comprising
         (A) about 10% to about 90% by weight of the amine component of one or more compounds selected from the group consisting of diethylene triamine, and saturated alkylene diamines containing 2 to 6 carbon atoms; and
         (B) about 10% to about 90% by weight of the amine component of one or more poly(oxyalkylene) diamines of the formula H-(Alk-O)$_n$—H wherein each Alk is substituted with —NH$_2$, and wherein n is selected such that the molecular weight of the poly(oxyalkylene)diamine is between 100 and 5000;
   (2) heating said polyamide to a temperature within the range of about 300 to about 350° F. to form a fluid polyamide;
   (3) applying said fluid polyamide as a spray onto the metallic substrate and forming a polyamide coating thereon.

2. A polyamide according to claim 1 wherein about 75 wt. % to about 90 wt. % of said acid component comprises said one or more dibasic carboxylic acids containing 28 to 44 carbon atoms and having 0 to 6 carbon-carbon double bonds.

3. The process of claim 1 wherein about 3 wt. % to about 20 wt. % of said acid component comprises said one or more tribasic carboxylic acids containing 42 to 66 carbon atoms and having 0 to 9 carbon-carbon double bonds.

4. A polyamide according to claim 1 wherein about 0.5 wt. % to about 5 wt. % of said acid component comprises said one or more polybasic carboxylic acids containing 2 to 14 carbon atoms, containing 2 to 4 —COOH groups, and containing 0 to 2 carbon-carbon double bonds.

5. The process of claim 1 wherein about 3 wt. % to about 20 wt. % of said acid component comprises said one or more monobasic carboxylic acids containing 14 to 22 carbon atoms and 0 to 3 carbon-carbon double bonds.

6. The process of claim 1 wherein about 10 wt. % to about 20 wt. % of said acid component comprises said one or more monobasic carboxylic acids containing 2 to 22 carbon atoms and 0 to 3 carbon-carbon double bonds.

7. The process of claim 1 wherein said one or more dibasic carboxylic acids contain 36 carbon atoms, said one or more tribasic carboxylic acids contain 54 carbon atoms, and said one or more monobasic carboxylic acids containing 14 to 22 carbon atoms contain 18 carbon atoms.

8. The process of claim 1 wherein said amine component comprises about 30 wt. % to about 40 wt. % of said one or more compounds selected from the group consisting of diethylene triamine and saturated alkylene diamines containing 2 to 6 carbon atoms, and about 60 wt. % to about 70 wt. % of said one or more poly(oxyalkylene)diamines.

9. The process of claim 8 wherein
    (a) about 75 wt. % to about 90 wt. % of said acid component comprises one or more dibasic carboxylic acids containing 28 to 44 carbon atoms and having 0 to 6 carbon-carbon double bonds;
    (b) from 3 to about 20 wt. % of said acid component comprises one or more tribasic carboxylic acids containing 42 to 66 carbon atoms and having 0 to 9 carbon-carbon double bonds;
    (c) from 0.5 to about 5 wt. % of said acid component comprises one or more polybasic carboxylic acids containing 2 to 14 carbon atoms, containing 2 to 4 —COOH groups, and containing 0 to 2 carbon-carbon double bonds;
    (d) about 3 wt. % to about 20 wt. % of said acid component comprises one or more monobasic carboxylic acids containing 14 to 22 carbon atoms and 0 to 3 carbon-carbon double bonds; and
    (e) another about 10 wt. % to about 20 wt. % of said acid component comprises one or more monobasic carboxylic acids containing 2 to 22 carbon atoms and 0 to 3 carbon-carbon double bonds.

10. The process of claim 9 wherein said one or more dibasic carboxylic acids contain 36 carbon atoms, said one or more tribasic carboxylic acids contain 54 carbon atoms, and said one or more monobasic carboxylic acids containing 14 to 22 carbon atoms contain 18 carbon atoms.

11. The process of claim 1 wherein
    (a) about 75 wt. % to about 90 wt. % of said acid component comprises one or more dibasic carboxylic acids containing 28 to 44 carbon atoms and having 0 to 6 carbon-carbon double bonds;
    (b) from 3 to about 20 wt. % of said acid component comprises one or more tribasic carboxylic acids containing 42 to 66 carbon atoms and having 0 to 9 carbon-carbon double bonds;
    (c) from 0.5 to about 5 wt. % of said acid component comprises one or more polybasic carboxylic acids containing 2 to 14 carbon atoms, containing 2 to 4 —COOH groups, and containing 0 to 2 carbon-carbon double bonds;
    (d) about 3 wt. % to about 20 wt. of said acid component comprises one or more monobasic carboxylic acids containing 14 to 22 carbon atoms and 0 to 3 carbon-carbon double bonds; and
    (e) another about 10 wt. % to about 20 wt. % of said acid component comprises one or more monobasic carboxylic acids containing 2 to 22 carbon atoms and 0 to 3 carbon-carbon double bonds.

12. The process of claim 11 wherein said one or more dibasic carboxylic acids contain 36 carbon atoms, said one or more tribasic carboxylic acids contain 54 carbon atoms, and said one or more monobasic carboxylic acids containing 14 to 22 carbon atoms contain 18 carbon atoms.

* * * * *